US007997981B2

(12) United States Patent
Rowe et al.

(10) Patent No.: US 7,997,981 B2
(45) Date of Patent: Aug. 16, 2011

(54) UNIVERSAL CASINO BONUSING SYSTEMS AND METHODS

(75) Inventors: Richard E. Rowe, Incline Village, NV (US); Richard J. Schneider, Las Vegas, NV (US); Eric W. Lancaster, Las Vegas, NV (US)

(73) Assignee: IGT, Reno, NV (US)

( * ) Notice: Subject to any disclaimer, the term of this patent is extended or adjusted under 35 U.S.C. 154(b) by 513 days.

(21) Appl. No.: 11/225,299

(22) Filed: Sep. 12, 2005

(65) Prior Publication Data

US 2007/0060237 A1 Mar. 15, 2007

(51) Int. Cl.
*A63F 13/00* (2006.01)

(52) U.S. Cl. ............................... 463/27; 463/26; 463/28

(58) Field of Classification Search .................... 463/16, 463/25, 26, 27, 28, 29, 42
See application file for complete search history.

(56) References Cited

U.S. PATENT DOCUMENTS

| | | | |
|---|---|---|---|
| 4,468,750 | A | 8/1984 | Charnoff et al. |
| 4,532,416 | A | 7/1985 | Berstein |
| 4,837,728 | A | 6/1989 | Barrie et al. |
| 4,856,787 | A | 8/1989 | Itkis |
| 4,868,900 | A | 9/1989 | McGuire |
| 5,103,079 | A | 4/1992 | Barakai et al. |
| 5,116,055 | A | 5/1992 | Tracy |
| 5,149,945 | A | 9/1992 | Johnson et al. |
| 5,249,800 | A | 10/1993 | Hilgendorf et al. |
| 5,275,400 | A | 1/1994 | Weingardt et al. |
| 5,280,909 | A | 1/1994 | Tracy |
| 5,286,023 | A | 2/1994 | Wood |
| 5,288,077 | A | 2/1994 | Jones |
| 5,344,144 | A | 9/1994 | Canon |
| 5,364,105 | A | 11/1994 | Jones |
| 5,380,008 | A | 1/1995 | Mathis et al. |
| 5,401,023 | A | 3/1995 | Wood |
| 5,401,024 | A | 3/1995 | Simunek |
| 5,466,920 | A | 11/1995 | Nair et al. |

(Continued)

FOREIGN PATENT DOCUMENTS

AU 199650576 4/1997

(Continued)

OTHER PUBLICATIONS

U.S. Appl. No. 11/224,903, filed Sep. 12, 2005.

(Continued)

*Primary Examiner* — James S McClellan
(74) *Attorney, Agent, or Firm* — Weaver Austin Villeneuve & Sampson LLP

(57) ABSTRACT

Methods and systems for providing a universal bonus within a gaming environment are disclosed. Such systems include universal bonuses that are made available to patrons of both gaming machines and other non-gaming machine gaming venues, such as gaming tables. Systems can include a gaming machine, a gaming table, and a universal system server. Tracking devices at both the gaming machines and gaming tables or other gaming venues facilitate the tracking of gaming events that give rise to the eligibility of a player to participate in the universal bonus. The same singular universal bonus is then made available to players playing entirely different games and/or at different gaming venues. Incorporated into the system are considerations for including slot machines, video poker machines, blackjack tables, poker tables, craps tables, roulette tables, keno lounges, sports books and other wager based games offered by a casino or other gaming establishment.

18 Claims, 4 Drawing Sheets

U.S. PATENT DOCUMENTS

| | | | |
|---|---|---|---|
| 5,472,194 | A | 12/1995 | Breeding et al. |
| 5,491,812 | A | 2/1996 | Pisello et al. |
| 5,580,309 | A | 12/1996 | Piechowiak et al. |
| 5,605,334 | A | 2/1997 | McCrea, Jr. |
| 5,611,730 | A | 3/1997 | Weiss |
| 5,643,086 | A | 7/1997 | Alcorn et al. |
| 5,651,548 | A | 7/1997 | French et al. |
| 5,655,961 | A | 8/1997 | Acres et al. |
| 5,702,304 | A | 12/1997 | Acres et al. |
| 5,707,287 | A | 1/1998 | McCrea, Jr. |
| 5,735,742 | A | 4/1998 | French |
| 5,743,798 | A | 4/1998 | Adams et al. |
| 5,761,647 | A | 6/1998 | Boushy |
| 5,766,076 | A | 6/1998 | Pease et al. |
| 5,781,647 | A | 7/1998 | Fishbine et al. |
| 5,819,107 | A | 10/1998 | Lichtman et al. |
| 5,820,459 | A | 10/1998 | Acres et al. |
| 5,851,148 | A | 12/1998 | Brune et al. |
| 5,941,769 | A * | 8/1999 | Order ............................ 463/12 |
| 6,003,013 | A | 12/1999 | Boushy et al. |
| 6,015,347 | A | 1/2000 | Maahs et al. |
| 6,033,307 | A | 3/2000 | Vancura |
| 6,104,815 | A | 8/2000 | Alcorn et al. |
| 6,106,396 | A | 8/2000 | Alcorn et al. |
| 6,110,043 | A | 8/2000 | Olsen |
| 6,113,492 | A | 9/2000 | Walker et al. |
| 6,135,887 | A | 10/2000 | Pease et al. |
| 6,149,522 | A | 11/2000 | Alcorn et al. |
| 6,183,362 | B1 | 2/2001 | Boushy |
| 6,193,152 | B1 | 2/2001 | Fernando et al. |
| 6,193,607 | B1 | 2/2001 | Kay |
| 6,217,448 | B1 | 4/2001 | Olsen |
| 6,231,442 | B1 | 5/2001 | Mayeroff |
| 6,241,608 | B1 | 6/2001 | Torango et al. |
| 6,302,793 | B1 | 10/2001 | Fertitta, III et al. |
| 6,306,035 | B1 | 10/2001 | Kelly et al. |
| 6,313,871 | B1 | 11/2001 | Schubert |
| 6,336,863 | B1 | 1/2002 | Baerlocher et al. |
| 6,346,044 | B1 | 2/2002 | McCrea, Jr. |
| 6,358,149 | B1 | 3/2002 | Schneider et al. |
| 6,368,216 | B1 | 4/2002 | Hedrick et al. |
| 6,371,852 | B1 | 4/2002 | Acres |
| 6,409,595 | B1 | 6/2002 | Uihlein et al. |
| 6,425,824 | B1 | 7/2002 | Baerlocher et al. |
| 6,454,648 | B1 | 9/2002 | Kelly et al. |
| 6,474,649 | B1 | 11/2002 | Kennedy et al. |
| 6,532,297 | B1 | 3/2003 | Lindquist |
| 6,592,458 | B1 | 7/2003 | Ho |
| 6,592,460 | B2 | 7/2003 | Torango et al. |
| 6,607,439 | B2 | 8/2003 | Schneier et al. |
| 6,645,077 | B2 | 11/2003 | Rowe |
| 6,663,490 | B2 | 12/2003 | Soltys et al. |
| 6,682,423 | B2 | 1/2004 | Brosnan et al. |
| 6,684,195 | B1 | 1/2004 | Deaton et al. |
| 6,776,715 | B2 | 8/2004 | Price |
| 6,857,959 | B1 | 2/2005 | Nguyen |
| 6,960,134 | B2 | 11/2005 | Hartl et al. |
| 6,984,174 | B2 | 1/2006 | Cannon et al. |
| 7,329,183 | B2 | 2/2008 | Michaelson et al. |
| 7,384,336 | B2 | 6/2008 | Torango |
| 2001/0038178 | A1 | 11/2001 | Vancura |
| 2001/0053712 | A1 | 12/2001 | Yoseloff et al. |
| 2002/0071557 | A1 | 6/2002 | Nguyen |
| 2002/0077178 | A1 | 6/2002 | Oberberger et al. |
| 2003/0022714 | A1 | 1/2003 | Oliver |
| 2003/0027625 | A1 | 2/2003 | Rowe |
| 2003/0027638 | A1 | 2/2003 | Schneider et al. |
| 2003/0060279 | A1 | 3/2003 | Torango et al. |
| 2003/0064798 | A1 | 4/2003 | Grauzer et al. |
| 2003/0092484 | A1 | 5/2003 | Schneider et al. |
| 2003/0104853 | A1 | 6/2003 | Tessmer et al. |
| 2003/0104860 | A1 | 6/2003 | Cannon et al. |
| 2003/0148808 | A1 | 8/2003 | Price |
| 2003/0162591 | A1 | 8/2003 | Nguyen et al. |
| 2003/0181231 | A1 | 9/2003 | Vancura et al. |
| 2003/0211883 | A1 | 11/2003 | Potts |
| 2004/0002385 | A1 | 1/2004 | Nguyen |
| 2004/0038735 | A1 | 2/2004 | Steil et al. |
| 2004/0066278 | A1 | 4/2004 | Hughes et al. |
| 2004/0142740 | A1 | 7/2004 | Damico et al. |
| 2004/0152511 | A1 | 8/2004 | Nicely et al. |
| 2004/0166923 | A1 | 8/2004 | Michaelson et al. |
| 2005/0020354 | A1 | 1/2005 | Nguyen et al. |
| 2005/0037837 | A1 | 2/2005 | Rowe |
| 2005/0043086 | A1 | 2/2005 | Schneider |
| 2005/0054438 | A1 | 3/2005 | Rothschild et al. |
| 2005/0059472 | A1 | 3/2005 | Joshi et al. |
| 2005/0059481 | A1 | 3/2005 | Joshi et al. |
| 2005/0096130 | A1 | 5/2005 | Mullins |
| 2005/0239542 | A1 | 10/2005 | Olsen |
| 2006/0035694 | A1 | 2/2006 | Fuller |
| 2006/0040736 | A1 | 2/2006 | Baerlocher et al. |
| 2006/0040743 | A1 | 2/2006 | Saffari et al. |
| 2006/0073889 | A1 | 4/2006 | Edidin et al. |
| 2006/0073897 | A1 | 4/2006 | Englman et al. |
| 2006/0100008 | A1 | 5/2006 | Wright et al. |
| 2006/0183537 | A1 | 8/2006 | Dickerson |
| 2006/0247035 | A1 | 11/2006 | Rowe et al. |
| 2007/0060311 | A1 | 3/2007 | Rowe et al. |
| 2007/0106553 | A1 * | 5/2007 | Jordan et al. .................... 705/14 |
| 2007/0298873 | A1 | 12/2007 | Nguyen et al. |

FOREIGN PATENT DOCUMENTS

| | | |
|---|---|---|
| AU | 754689 | 2/1999 |
| AU | 766341 | 1/2002 |
| EP | 769769 | 4/1997 |
| EP | 1211630 | 6/2002 |
| EP | 1380998 | 1/2004 |
| EP | 1528514 | 5/2005 |
| EP | 1554021 | 7/2005 |
| EP | 1938288 | 7/2008 |
| JP | 2003279648 | 10/2003 |
| WO | WO96/06409 | 2/1996 |
| WO | WO96/36253 | 11/1996 |
| WO | 97/44750 | 11/1997 |
| WO | WO00/16289 | 3/2000 |
| WO | WO00/22585 | 4/2000 |
| WO | WO02/077939 | 10/2002 |
| WO | 2004/027584 | 4/2004 |
| WO | WO 2004/088604 | 10/2004 |
| WO | WO2005/022443 | 3/2005 |
| WO | WO2005/105235 | 11/2005 |
| WO | 2006/023681 | 3/2006 |
| WO | WO2006/037220 | 4/2006 |
| WO | WO2007/032954 | 3/2007 |
| WO | 2007/145999 | 12/2007 |
| WO | WO 2007/149180 | 12/2007 |

OTHER PUBLICATIONS

PCT Search Report and Written Opinion from Corresponding International Application No. PCT/US2006/034510, dated Apr. 6, 2007, 15 pages. (249W0).

EPO Office Action mailed Jul. 8, 2008 in European Application No. 06790165.2, 6 pages (249EP).

Wang et al., “Casino Technology: Player Tracking and Slot Accounting Systems”, Gaming Res. Rev. J. (USA), Gaming Research & Review Journal, Univ. Nevada (Abstract).

Written Opinion dated Dec. 13, 2007 issued in PCT/US2007/013325 (WO2007/145999).

International Search Report dated Dec. 13, 2007 issued in PCT/US2007/013325 (WO2007/145999).

International Search Report dated Nov. 1, 2004 issued in PCT/US2003/030170 (WO2004/027584).

Written Opinion dated May 23, 2005 issued in PCT/US2003/030170 (WO2004/027584).

European Supplemental Search Report dated May 15, 2007 issued in EP03754879.

Office Action dated Jul. 2, 2004 for U.S. Appl. No. 10/670,153.

Office Action dated Jan. 5, 2005 for U.S. Appl. No. 10/670,153.

Final Office Action dated May 26, 2005 for U.S. Appl. No. 10/670,153.

Advisory Action dated Aug. 8, 2005 for U.S. Appl. No. 10/670,153.

Office Action dated Oct. 26, 2005 for U.S. Appl. No. 10/670,153.

Interview Summary dated Jan. 24, 2006 for U.S. Appl. No. 10/670,153.
Final Office Action dated Aug. 1, 2006 for U.S. Appl. No. 10/670,153.
Advisory Action dated Oct. 20, 2006 for U.S. Appl. No. 10/670,153.
Office Action dated Jun. 1, 2007 for U.S. Appl. No. 10/670,153.
Final Office Action dated Feb. 14, 2008 for U.S. Appl. No. 10/670,153.
Office Action dated Sep. 11, 2008 for U.S. Appl. No. 10/670,153.
U.S. Appl. No. 09/642,192, filed Aug. 18, 2000, Entitled: Gaming Machine Virtual Player Tracking and Related Services.
International Search Report dated Dec. 22, 2005 mailed Jan. 12, 2006, from corresponding International Application, No. PCT/US2005/029465, 4 pp.
Written Opinion of the International Searching Authority mailed Jan. 12, 2006, from corresponding International Application No. PCT/US2005/029465, 6 pp.
Office Action dated Jul. 1, 2002 for U.S. Appl. No. 09/642,192.
Final Office Action dated Jan. 2, 2003 for U.S. Appl. No. 09/642,192.
Office Action dated Apr. 21, 2003 for U.S. Appl. No. 09/642,192.
Final Office Action dated Sep. 30, 2003 for U.S. Appl. No. 09/642,192.
Office Action dated Feb. 10, 2004 for U.S. Appl. No. 09/642,192.
Office Action dated Jul. 1, 2004 for U.S. Appl. No. 09/642,192.
Final Office Action dated Mar. 28, 2006 for U.S. Appl. No. 09/642,192.
Office Action dated Nov. 20, 2006 for U.S. Appl. No. 09/642,192.
Office Action mailed on Apr. 2, 2008 for U.S. Appl. No. 10/923,333.
Final Office Action mailed on Oct. 21, 2008 for U.S. Appl. No. 10/923,333.
US Office Action dated Apr. 27, 2009 issued in U.S. Appl. No. 10/923,333.
US Office Action Final dated Nov. 20, 2009 issued in U.S. Appl. No. 10/923,333.
US Examiner Interview Summary dated Feb. 26, 2010 issued in U.S. Appl. No. 10/923,333.
US Office Action dated Jul. 14, 2010 issued in U.S. Appl. No. 10/923,333.
US Office Action Final dated Dec. 17, 2010 issued in U.S. Appl. No. 10/923,333.
US Notice of Panel Decision from Pre-Appeal Brief Review dated Apr. 27, 2011 issued in U.S. Appl. No. 10/923,333.
US Office Action dated Mar. 31, 2009 issued in U.S. Appl. No. 11/449,985.
US Office Action Final dated Mar. 3, 2010 issued in U.S. Appl. No. 11/449,985.
US Office Action dated Aug. 9, 2010 issued in U.S. Appl. No. 11/449,985.
US Office Action Final dated Mar. 7, 2011 issued in U.S. Appl. No. 11/449,985.
US Office Action dated Apr. 15, 2008 issued in U.S. Appl. No. 11/425,998.
US Office Action dated Dec. 19, 2008 issued in U.S. Appl. No. 11/425,998.
US Office Action Final dated Aug. 4, 2009 issued in U.S. Appl. No. 11/425,998.
US Office Action dated Dec. 22, 2009 issued in U.S. Appl. No. 11/425,998.
US Office Action dated Jun. 23, 2010 issued in U.S. Appl. No. 11/425,998.
US Office Action Final dated Dec. 2, 2010 issued in U.S. Appl. No. 11/425,998.
US Interview Summary dated Jul. 21, 2005 issued in U.S. Appl. No. 10/670,153.
US Final Office Action dated Apr. 6, 2009 issued in U.S. Appl. No. 10/670,153.
US Examiner Interview Summary dated Nov. 6, 2009 issued in U.S. Appl. No. 10/670,153.
US Office Action dated Dec. 9, 2009 issued in U.S. Appl. No. 10/670,153.
PCT International Preliminary Report on Patentability and Written Opinion dated Feb. 20, 2007 issued in PCT/US2005/029465 (WO2006/23681).
Chinese First Office Action dated Jun. 12, 2010 issued in CN 200780027102.0.
Chinese Second Office Action dated Mar. 10, 2011 issued in CN 200780027102.0.
European Examination Report dated Oct. 5, 2009 issued in EP 07 809 360.6-1238.
PCT International Search Report dated Feb. 6, 2008 issued in PCT/U52007/012453 (WO 2007/149180).
PCT International Preliminary Report on Patentability and Written Opinion dated Dec. 22, 2008 issued in PCT/US2007/012453 (WO 2007/149180).
PCT International Preliminary Examination Report dated Aug. 24, 2005 issued in PCT/US2003/30170 (WO 2004/027584).
European Office Action dated Feb. 1, 2010 issued in EP 03 754 879.9-1238.

* cited by examiner

UNIVERSAL CASINO BONUSING SYSTEMS AND METHODS

TECHNICAL FIELD

The present invention relates generally to gaming systems within a casino environment, and more specifically to systems and methods for providing bonus awards within a casino environment.

BACKGROUND

Casinos and other forms of gaming comprise a growing multi-billion dollar industry both domestically and abroad, with electronic and microprocessor based gaming machines being more popular than ever. In a typical electronic gaming machine, such as a slot machine, video poker machine, video keno machine or the like, a game play is initiated through a player wager of money or credit, whereupon the gaming machine determines a game outcome, presents the game outcome to the player and then potentially dispenses an award of some type, including a monetary award, depending upon the game outcome. Many additional gaming machine components, features and programs have been made possible in recent years through this proliferation of electronic gaming machines, including those involving linked progressive jackpots, player tracking and loyalty points programs, and various forms of cashless gaming, among other items. Many of these added components, features and programs can involve the implementation of various back-end and/or networked systems, including more hardware and software elements, as is generally known.

In addition to gaming machines, various other games and wager based offerings to patrons within a casino are well known. For example, while gaming machines have become a staple for many casinos and gaming establishments, table games remain an immensely popular form of gaming and a substantial source of revenue for gaming operators as well. Such table games can include poker, blackjack, craps, roulette and other traditional standbys, as well as other more recently introduced games such as pai-gow, Carribean Stud, Spanish 21, and Let It Ride, among others. Under a typical gaming event at a gaming table, a player places a wager on a game, whereupon a winning may be paid to the player depending on the outcome of the game. As is generally known, a wager may involve the use of cash or one or more chips, markers or the like, as well as various forms of gestures or oral claims. The game itself may involve the use of, for example, one or more cards, dice, wheels, balls, tokens or the like, with the rules of the game and any payouts or pay tables being established prior to game play. As is also known, possible winnings may be paid in cash, credit, one or more chips, markers, or prizes, or by other forms of payouts. In addition to table games, other games within a casino or other gaming environment are also widely known. For instance, keno, bingo, sports books, and ticket drawings, among others, are all examples of wager based games and other events that patrons may partake of within a casino or other gaming establishment.

One well known way of generating extra interest and excitement for patrons of a casino is to provide bonuses to those who play games involving the placement of a wager and possible monetary payout as a result. Such bonuses generally tend to be in addition to any customary payout for a regular outcome of the game. As is generally known, bonusing within a casino or other gaming environment tends to involve slot machines for the most part. Although bonusing programs or schemes might be available with respect to a table game on occasion, such bonuses are typically limited in nature, such as to the specific table or genre of table games within the casino. In the event that bonuses may actually be provided for a table game or other alternative venue within a casino or other gaming establishment, such bonuses tend to be isolated and sporadic in nature.

Some forms of table games have traditionally had no form of bonus at all. For example, the game of roulette is typically an independent game within the casino having no connection to any other casino game. Similarly, the game of craps also tends to be independent and without connection to any other game. Although such games surely have their place on the casino floor, such isolation can be a drawback for some games, particularly where casual players tend to flock to games that seem to be more popular, or at least tied to some general theme marketed by the casino. In particular, games that involve bonuses may tend to be more exciting or enticing to many casual gaming patrons. Further, the lack of a consistent theme or bonusing scheme from one type of game to the next, assuming such games have any type of bonusing scheme at all, may be detrimental from the point of view of some players. As such, these players may be less likely to try different games, or to even go to a casino with friends or family who do not play the same kinds of games that they do.

While existing systems and methods for providing bonuses within gaming machines, at gaming tables, and in a casino environment have generally been adequate in the past, improvements are usually welcomed and encouraged. In light of the foregoing, it is desirable to develop systems and methods involving game bonuses that are more attractive to players and potential players, and in particular for such systems and methods to be able to provide bonuses across game offerings within a casino environment.

SUMMARY

It is an advantage of the present invention to provide improved systems and methods for bonusing within a casino environment. This is accomplished in many embodiments by providing within or about a casino or other gaming establishment a universal bonus system adapted to offer the same bonusing schemes or plans to both gaming machines and gaming tables alike. Further gaming venues, such as keno and sports books, may also take part in the universal bonusing systems and methods provided herein.

According to several embodiments of the present invention, the disclosed systems and methods involve a universal bonus that is made available to players of varying types of games at a variety of disparate gaming venues. Such a universal bonus can be a singular universal bonus, as well as a series of universal bonuses. Included in such systems can be one or more gaming machines, one or more gaming tables, and/or one or more other types of non-gaming machine gaming venues, such as sports books or keno lounges. Where gaming machines are involved, such gaming machine or machines can include an outer housing, a master gaming controller and at least one gaming machine tracking device adapted to facilitate the tracking of gaming events associated with a patron playing a main game at the gaming machine. Where gaming tables are involved, such a gaming table or tables can include a chip tray, an upper surface adapted for the play of table games, and at least one gaming table tracking device adapted to facilitate the tracking of gaming events associated with a patron playing a primary or main game at the gaming table.

In addition to gaming machines, gaming tables, and other associated gaming venues, the inventive systems and methods can include a universal bonus server in direct or indirect communication with many or all of said gaming machine tracking devices and many or all of said gaming table tracking devices. Such a universal bonus server can include communication links to each such tracking device, and is preferably adapted to track specific gaming activities at both gaming machines and gaming tables. In particular, the universal bonus server can be adapted to provide and administer one or more singular universal bonuses to players of both the gaming machines and players of the table games or games at other alternative gaming venues.

Various detailed versions of the present invention can include more specific devices as the gaming activity tracking devices. Such devices can include standard player tracking devices found at many current gaming machines, as well as player tracking cards that are traditionally available for use with both gaming machines and gaming tables. In some embodiments, various gaming table tracking devices can include RFID transponders located at the gaming tables, as well as various gaming chips having RFID tags embedded therein to facilitate the tracking of individual gaming chips at the gaming table. In some embodiments, the gaming table tracking devices can include a camera system adapted to capture images of gaming chips involved in transactions at the gaming table, as well as imaging and processing software adapted to track transactions involving gaming chips through the visual images of those chips as captured at the gaming table.

In other detailed versions of the present invention, the singular universal bonus or series of bonuses can be a themed bonus that can be applied across a plurality of disparate types of games, such as at gaming machines and also at table games. Such a themed bonus can involve a "lucky number" or a "lucky coin," as such items might apply to the play of games at a participating gaming venue. Such gaming venues can include slot machine games, video poker games, keno games, sports book games, blackjack games, poker games, roulette games, and craps games, among others. In some embodiments, the themed "lucky number" or other themed game parameter is determined by the specific outcome of a particular main game play selected from any of the participating game venues. The universal gaming system can also include a database in communication with the universal bonus server. Such a database can be adapted to store information related to the administration and tracking of a plurality of singular universal bonuses provided by said gaming system, as well as various other items that might be related to player tracking, game tracking or other items for which the gaming establishment might wish to collect information.

In other embodiments, various methods of providing universal bonuses associated with gaming events are provided. Such methods can include the provision of gaming machines and other non-gaming machine related gaming venues, such as a gaming table. Process steps can include the tracking of games played on the gaming machines, as well as games played at the gaming tables or other non-gaming machine related venues. Events tracked can include those involving the placement of wagers, the play of games based on the wagers, and the granting of monetary awards based on the outcomes of the games. Additional process steps can include granting eligibility status to patrons of both the gaming machines and to patrons of the non-gaming machine gaming venues to be eligible for the award of a singular universal bonus based upon their respective wagers, as well as awarding one or more singular universal bonuses to such players who are then eligible for such bonuses.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing universal bonuses within a gaming environment. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of systems and methods that provide a universal bonus to gaming machines and table games alike. This can be accomplished at least in part by the introduction of a comprehensive player and wager tracking system, which is able to track wagers at any participating venue within the casino environment. In some embodiments, a separate dedicated universal bonus server is used to track various disparate gaming activities, and in some instances to aid in the award of bonuses where appropriate. This is particularly useful where a casino or other gaming establishment desires to provide a more comprehensive bonusing and/or themed system to appeal to all players of all games within the casino.

Figure 1:
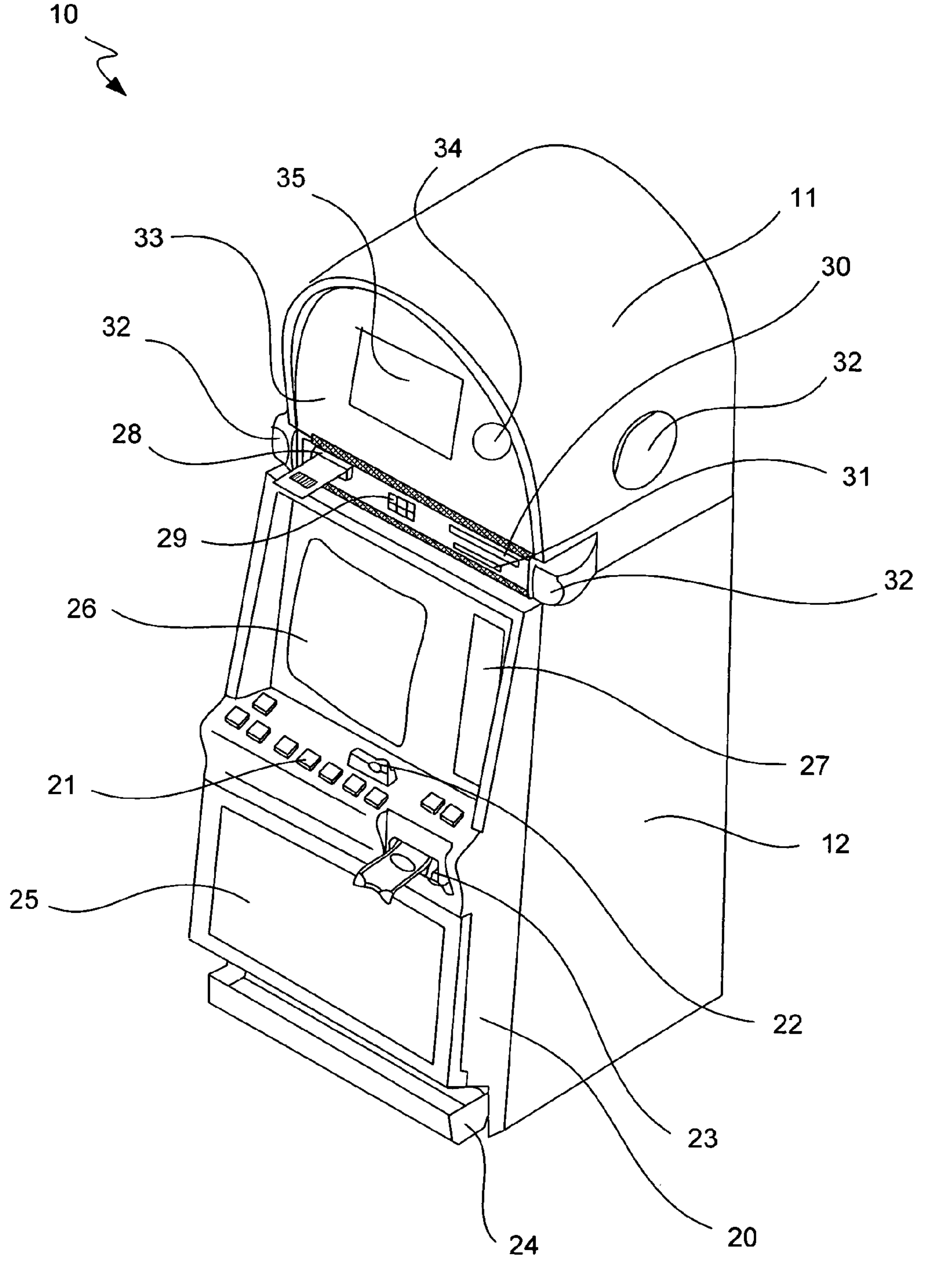
FIG. 1 illustrates in top perspective view an exemplary gaming machine according to one embodiment of the present invention.

Referring first to FIG. 1, an exemplary gaming machine is illustrated in top perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display, among others. In addition to the items depicted, a typical electronic gaming machine comprises a central processing unit ("CPU") or master gaming controller ("MGC") (not shown) that controls various combinations of hardware and software devices and components that encourage game play, allow a player to play a game on the gaming machine and control payouts and other awards. It will be understood that many makes, models, types and varieties of gaming machines exist, that not every such gaming machine will include each of the foregoing items, and that many gaming machines will include other items not shown. Such gaming machines are made by many manufacturers, such as, for example, IGT.

With respect to electronic gaming machines in particular, the electronic gaming machines made by IGT are provided with special features and additional circuitry that differentiate them from general-purpose computers, such as a laptop or desktop personal computer("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

With respect to the basic gaming abilities provided, it will be readily understood that gaming machine 10 can be adapted for presenting and playing any of a number of gaming events, particularly games of chance involving a player wager and potential monetary or other payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features, functions and devices may also be used in association with gaming machine 10, and it is contemplated that the present invention can be used in conjunction with a gaming machine or device that might encompass any or all such additional types of features, functions and devices.

One item that is specifically contemplated for use with the present invention involves a gaming machine that incorporates a player tracking system of some sort. Such player tracking systems are generally known in the art, and various types and mechanisms for such systems can be found at, for example, U.S. Pat. Nos. 5,655,961, 5,761,647, and 6,409,595, each of which is incorporated by reference herein in its entirety and for all purposes. In particular, information that is captured through the use of such a system can be used in conjunction with providing bonuses to players through the universal bonus system disclosed herein. Alternatively, a separate networked bonusing system in communication with all participating gaming machines can be provided, such as that which is done for the Megabucks® networked jackpot system known in the art. Of course, for such a bonus system to be universal, further connections with table games and other alternative gaming venues also exist.

Figure 2:
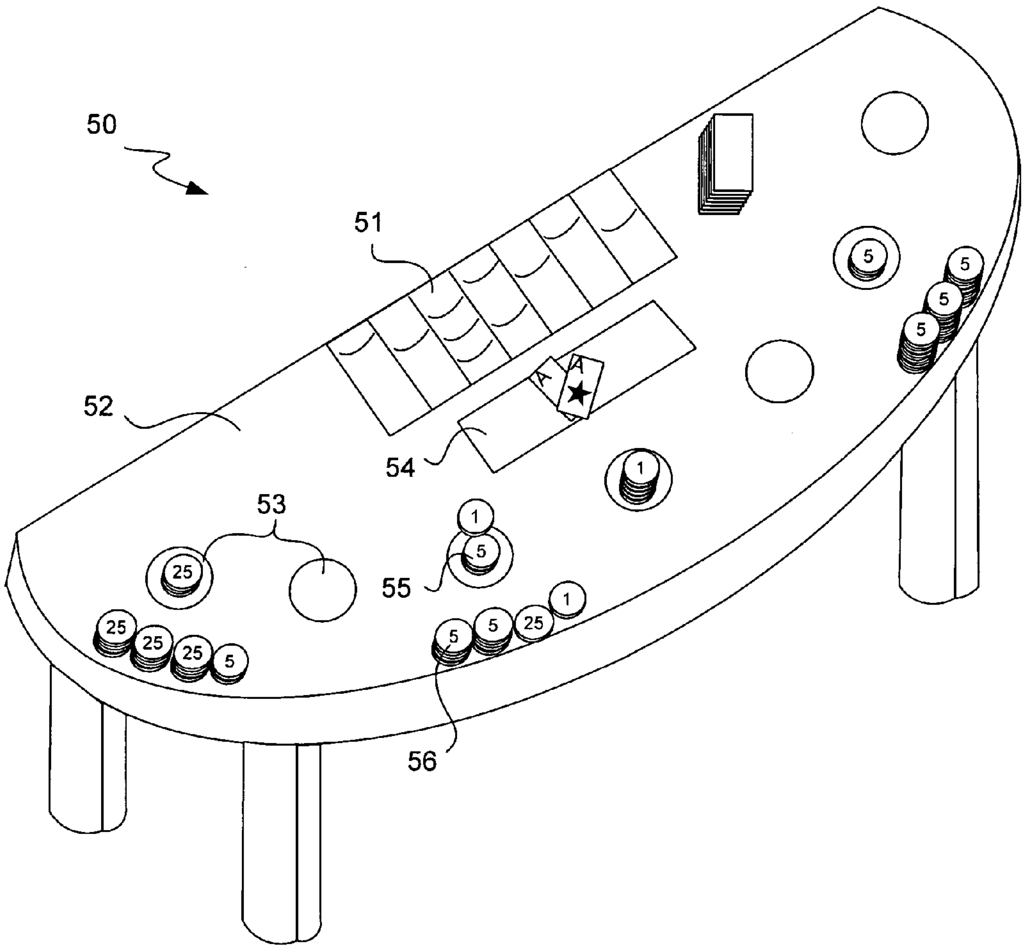
FIG. 2 illustrates in top perspective view an exemplary gaming table according to one embodiment of the present invention.

Continuing now to FIG. 2, an exemplary gaming table according to one embodiment of the present invention is illustrated in top perspective view. From its outer appearance, gaming table 10 preferably generally looks to be just like any other gaming table that a patron might encounter at a casino or other gaming establishment. Differences between specialized gaming table 10 and any other ordinary gaming table can include the presence of RFID gaming chips in use at the table, as well as RFID reading devices and other related components, which may preferably be located beneath the gaming table or in other non-obtrusive locations. Further details of the use of RFID tags within gaming chips to facilitate gaming chip identification and tracking can be found at, for example, U.S. Pat. Nos. 5,651,548 and 5,735,742, as well as U.S. patent application Ser. No. 11/224,903, filed on Sep. 12, 2005, and entitled "Enhanced Gaming Chips and Table Game Security," each of which is incorporated by reference herein in its entirety and for all purposes. Alternatively, gaming chip tracking at gaming tables and other alternative gaming venues can be accomplished by way of cameras or other visual equipment, as well as various image processing and software tracking programs. Further details of such visually based gaming chip tracking applications can generally be found at, for example, U.S. Pat. Nos. 5,781,647; 6,313,871; 6,532,297; and 6,663,490, each of which is incorporated by reference herein in its entirety and for all purposes.

Gaming table 50 has a chip tray 51 adapted to store a plurality of gaming chips, including RFID gaming chips, as well as an upper surface 52 adapted for the play of games and various other transactions involving gaming chips. Various designated chip placement areas 53, 54 are distributed about the upper surface 52 of the gaming table 50. Such chip placement areas can include bet or wager placement areas 53, as well as a general cash for chips or other chip conversion area 54. Gaming chips 55, 56 of one or more denominations may also be located atop the upper surface 52 of the gaming table, particularly during times of gaming activity at the table. For example, gaming chip 55 is a $5 chip that is subject to a current wager in a bet placement area, while gaming chip 56 is a $5 chip designated as belonging to a player that is not subject to a current play or action at the gaming table. As will be readily appreciated, gaming chips 55 and 56 may be identical or substantially similar, with the possible exception of RFID tags contained within or about the chips. Such RFID tags might be located at the gaming chips in various configurations, as detailed in previously noted U.S. Pat. Nos. 5,651,548 and 5,735,742, and U.S. patent application Ser. No. 11/224,903.

Although gaming table 10 has the general appearance of a blackjack table or a gaming table for a similarly distributed and played game, it will be readily appreciated that the gaming tables used in conjunction with the present invention can also be extended to other forms of gaming tables and gaming venues. For example, similar specialized gaming tables or venues can be adapted for use as a craps table, a roulette layout, and/or a sports book counter or presentation, among other suitable gaming tables or venues. In fact, it is specifically contemplated that any gaming table, counter or venue where a wager can be tracked with respect to a particular player can be involved in the universal bonusing systems and methods provided herein. Thus, where keno wagers, sports book wagers, and other gaming transactions of any sort can be correlated to a player, such game plays or transactions can also be included as part of the universal bonus system. For such transactions to be tracked, in some instances it may become necessary for a given player to provide identification, which may be accomplished through the use of a player tracking card, for example.

Figure 3:
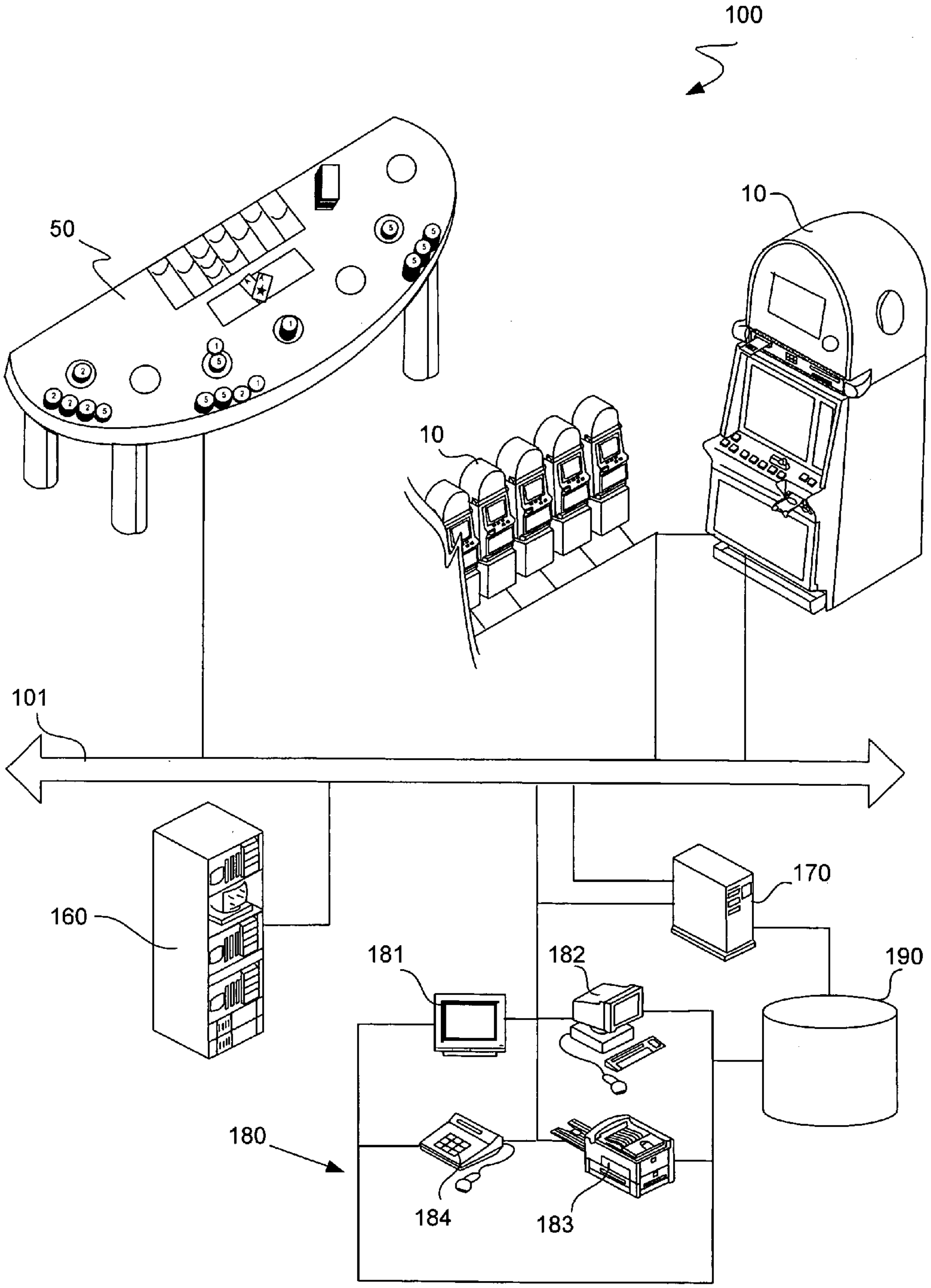
FIG. 3 illustrates a block diagram of a network infrastructure for providing a universal bonus system distributed across a gaming establishment according to one embodiment of the present invention.

Turning next to FIG. 3, an exemplary network infrastructure for providing a universal bonus system distributed across a gaming establishment is illustrated in block diagram format. Exemplary universal bonus system 100 interconnects one or more gaming machines 10, one or more gaming tables 50, various communication items, and a number of host-side components and devices adapted for use within a gaming environment. As shown, one or more gaming machines 10 adapted for use in gaming system 100 can be in a plurality of locations, such as in banks on a casino floor or standing alone at an isolated location, such as at a bar or in a passageway, as desired. Similarly, one or more gaming tables 50 can be located at various pits on the casino floor. Although only one gaming table is shown for purposes of illustration, it will be readily understood that many or all of the gaming tables on the casino floor can be interconnected to and a part of the universal bonus system 100. In addition, various other gaming venues or locations where gaming related transactions may occur (not shown) can also interconnected to and part of the universal bonus system. Again, such venues can include keno lounges, sports books, cashiers cages and any other location where gaming wagers and related transactions can be tracked.

Within universal bonus system 100, a common bus 101 or other similarly suitable device or devices can connect the various system gaming machines, devices, gaming tables and other associated gaming venues to a number of networked devices on the bonus system, such as, for example, a general-purpose server 160, one or more special-purpose servers 170, at least one sub-network of peripheral devices 180, and/or a database 190. A general-purpose server 170 may be one that is already present within a casino or other relevant gaming establishment for one or more other purposes beyond any functions associated with a universal bonus system. Functions for such a general-purpose server can include, for example, other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. Such a server may contain various programs related to player tracking operations, specific player account administration, remote game play administration, remote game player verification, downloadable gaming, and/or visual image or video data storage, transfer and distribution, and may also be linked to one or more gaming machines, in some cases forming a network that includes all or many of the gaming machines, devices, gaming tables, and/or other gaming related venues within the gaming establishment. Communications can then be exchanged from each adapted gaming machine, gaming table and gaming venue to one or more related programs or modules on the general-purpose server.

In some embodiments, universal bonus system 100 contains one or more special-purpose servers 170 that can be used for various functions relating to the provision of various specialty functions within a casino, such as universal bonus tracking, administration and operation under the present methods and systems. Such a special-purpose server or servers could include, for example, a cashless gaming server, a player verification server, a general game server, a downloadable games server, a specialized accounting server, and/or a visual image or video distribution server, as well as a server dedicated solely to tracking and administering universal bonuses, among others. Of course, these functions may all be combined onto a single server, such as illustrated specialized server 170. Such additional special-purpose servers are desirable for a variety of reasons, such as, for example, to lessen the burden on an existing general-purpose server or to isolate or wall off some or all gaming machine administration and operations data and functions from the general-purpose server, and thereby increase security and limit the possible modes of access to such operations and information.

Alternatively, exemplary universal bonus system 100 can be isolated from any other network at the establishment, such that a general-purpose server 160 is essentially impractical and unnecessary. In such an isolated embodiment, it may be preferable to have only a specific purpose server 170 dedicated solely to tracking and administering universal bonuses and related functions. Alternatively, in lieu of total isolation from all other casino networks, such a universal bonus system might be tied into an existing player tracking network. Under either embodiment of an isolated or shared network, one or more of the special-purpose servers are preferably connected to sub-network 180, which might be, for example, a cashier station or terminal, or a management back room where gaming operations can be monitored remotely. Peripheral devices in this sub-network may include, for example, one or more video displays 181, one or more user terminals 182, one or more printers 183, and one or more other input devices 184, such as a card reader or other security identifier, among others. Under either embodiment of an isolated or shared network, at least the specialized server 170 or another similar component within a general-purpose server 160 preferably includes a connection to a database or other suitable storage medium 190. Database 190 can be adapted to store many or all files containing pertinent data or information regarding universal system bonuses, among other potential items. Files, data and other information on database 190 can be stored for backup purposes, and are preferably accessible at one or more system locations, such as at a general-purpose server 160, a special purpose server 170 and/or a cashier station or other sub-network location 180, as desired.

While universal bonus system 100 can be a system that is specially designed and created new for use in a casino or other gaming establishment, it is also possible that many items in this system can be taken or adopted from an existing gaming system. For example, universal bonus system 100 could be "piggybacked" onto an existing player tracking system, to which one or more universal bonusing components or program modules are added. In addition to new hardware, new functionality via new software, modules, updates or otherwise can be provided to an existing database 190, specialized server 170 and/or general-purpose server 160, as desired. In this manner, the methods and systems of the present invention may be practiced at reduced costs by gaming operators that already have existing gaming systems, such as an existing player tracking system, by simply modifying the existing player tracking system. Other modifications to an existing system may also be necessary, as might be readily appreciated, in order to implement the various universal bonus systems and methods provided herein.

According to various embodiments of the present invention, the above gaming machines, tables, venues and systems can be used to implement a "universal bonus system" having various bonuses that are made available at least to players of both gaming machines and table games within a gaming environment. That is, anyone playing any form of traceable wager based game within the casino may be eligible to win a bonus from the universal bonus system. Such a universal bonus effectively bridges gaming machine play with table game play to facilitate the migration of various player types across the entire gaming floor, and can provide an overall sense of involvement and camaraderie to players of different game types. As noted above, such universal bonuses can be made available from, tracked at, and/or distributed by a universal game server, such as the specialized server 170 of universal bonus system 100 of FIG. 3.

According to various embodiments of the present invention, it is generally preferable that players eligible to win a singular universal bonus or any of a series of universal bonuses are generally those players playing at games where specific player activities are tracked. For example, it is generally well known in the art that player tracking systems are frequently associated with gaming machines. In such systems, players can insert their player tracking cards into a gaming machine while the player plays the gaming machine, and player tracking points or credits are granted to the player based on the length and levels of play. Accordingly, use of an existing player tracking system, at least to communicate with a specialized universal bonus server, may a preferable approach to implementing such a universal bonus system. In a similar manner, player tracking cards may also be used at gaming tables, such as where players hand their cards to a dealer or other casino personnel to track player activities at the gaming table. Such tracking at both gaming machines and gaming tables can then be used to facilitate the awarding of universal bonuses. Similar player tracking approaches can be used to permit players of other game offerings at the casino to participate in the universal system bonus programs, such as, for example, at keno lounges and sports books. In such instances, a player could similarly provide his or her player tracking card to be eligible for the universal bonus.

In general, the various universal bonusing systems and methods provided herein enable players that play at gaming machines, gaming tables, or both to take advantage of a common bonus available to all players. Players can then be motivated to continue to play the games that they enjoy, while feeling as though they are a part of an overall bonus system or casino theme. For example, a husband may enjoy table games, while his wife may enjoy slot machines or video poker machines. Under the present system, both the husband and wife can take part in the same bonusing program. Of course, friends and other relations may also enjoy taking part in the same universal bonusing system regardless of the specific games that each individual might be playing. In addition, players could also be motivated to try new games, since there would at least be some familiarity of the player with the universal bonusing aspect of a new game that they might try. The singular or series of universal bonuses could then be directed to any slots patron or any table game patron making a wager at a respective game. Such a bonus might be called a "universal bonus," a "lucky wager bonus," a "total rewards bonus" or the like.

In some embodiments, gaming machine networks, table game networks and any other network for tracked gaming activities are integrated to track a total player "worth" or value to the casino. Credits for all gaming activities can be granted to a patron regardless of the game that the patron plays. Depending upon the exact genre of a game, its expected take or value to the casino, and numerous other factors relating to size of wager and player profile, a wide variety of factors could be used for determining eligibility for the universal bonus. For example, the universal bonus might be funded by taking a small portion of all wagers for all games eligible to participate in the bonus. For games like blackjack and craps, where the house edge is traditionally lower than other games, a smaller portion of each wager might be taken to provide for a universal bonus pool. Depending upon the amount of contributions from each type of game, different odds might also attach to the requirements that need to be met for a universal bonus win at a particular game. For example, a game that may not contribute as much money to the overall universal bonus pool or prize fund, such as craps, may result in a more difficult way for a player to hit the universal bonus when offered, such as, for example, needing to roll five sevens in a row. In contrast, a more popular game, like blackjack, which might contribute more funds to the overall prize pool, could have a lowered requirement to hit the bonus, such as, for example, a starting hand of only two sevens.

As another example, a "Lucky Coin In" bonus is presently played on the slot floor, with such a bonus generally being limited to gaming machine play only. Under such a bonus system, a bonus is typically issued to a player who has played the "Nth" "coin in" played on any of the gaming machines participating in the Lucky Coin bonus. Under the present invention, such a lucky coin in bonus can be extended to other gaming venues, such as table games, keno lounges or sports books. Using RFID technologies or visually based chips tracking technologies, as noted above, a table gaming system or other alternative gaming venue adapted for tracking gaming chips at a gaming table or other location can track a variety of wagers, wins, payouts, buyins, and other transactions by patrons at such gaming tables or alternative venues. Similar tracking can be had for keno plays, sports book plays and other gaming plays suitable for participation in such a universal bonus system. After any appropriate or desired adjustments are made for the amount of "coin in" or money wagered on any particular game or sporting outcome, a universal bonus "lucky coin in" winner can be determined as the Nth coin or Nth wager made in the overall system, and an appropriate bonus could then be awarded to the lucky player.

In addition to straight monetary awards, many forms of bonusing could be integrated into any participating gaming venue, such as the slots floor, the table game area, the keno area, and/or the sports book, among other possibilities. Such added forms of bonusing could include extra credits, return or extra play, promotional pays, coupon offers or comps, and so forth. Further, with advances in card reading technology and card shoes, additional bonuses such as "card of the day," "lucky card," and other specialty card game bonuses can be offered. For example, a "queen of heart" bonus might be made available to all slots and table game players who might possibly receive a queen of hearts during game play. When a queen of hearts is dealt, the receiving player would then get some form of bonus or consideration, such as a possible comp. This could take place on video poker machines, at blackjack tables, at poker tables, or at any gaming table where regular decks of playing cards are used. Of course, due to the highly likely nature of getting a single queen of hearts, such a bonus could be modified to require a pair of queens to be able to win.

Other games might also be included within the universal bonus network, with adjusted considerations depending on the type of game. For example, a craps table might be included in the bonusing network for a "sevens bonus," with a bonus being awarded for a specific roll (e.g., a "7"). At the same time, bonuses might be awarded for a player receiving a 7 at a blackjack table, or a player receiving a 7 on a video poker machine. For any of the activities to qualify for the bonus, a minimum bet might be implemented. For example, for a player to be eligible to win the "lucky seven" bonus, a wager of at least $10 on the game play involved might be required. In order to make the hitting of the bonus more difficult, a number of consecutive 7s might be required. To compensate for varying odds at the different disparate games or gaming venues, a universal bonus win might require two straight sevens at a roulette wheel, three straight sevens at a card game, and six straight sevens at a craps table, among other possibilities.

Using the universal bonus network tied to slots and table games, a special bonus can also be had with respect to a given outcome at a particular game, such as a wheel spin or outcome at the roulette table. In this case, information regarding the roulette wheel could be communicated about the casino via displays. A generation of a lucky number at the roulette wheel could result in bonuses across the casino for any game where that lucky number could be replicated. For example, any part of any roulette game, card game, craps game, keno game, bingo game, slots game or any other game capable of generating that same number would then provide a bonus to an appropriate player when that number is indeed replicated. For two digit numbers, such as "25," games that are not able to replicate such a number could still participate in the bonus where a 2 and a 5 are provided. For example, a blackjack hand or poker hand of a 2 and a 5 could result in the "25" being made at that table to win the lucky roulette determined bonus. Of course, any game could be used to set such a particular bonus in motion, and such use would not be limited to a roulette spin. For example, the next card out of particular card shoe at a gaming table might also be used to set the next lucky number for all possible games participating in the universal bonus.

Figure 4:
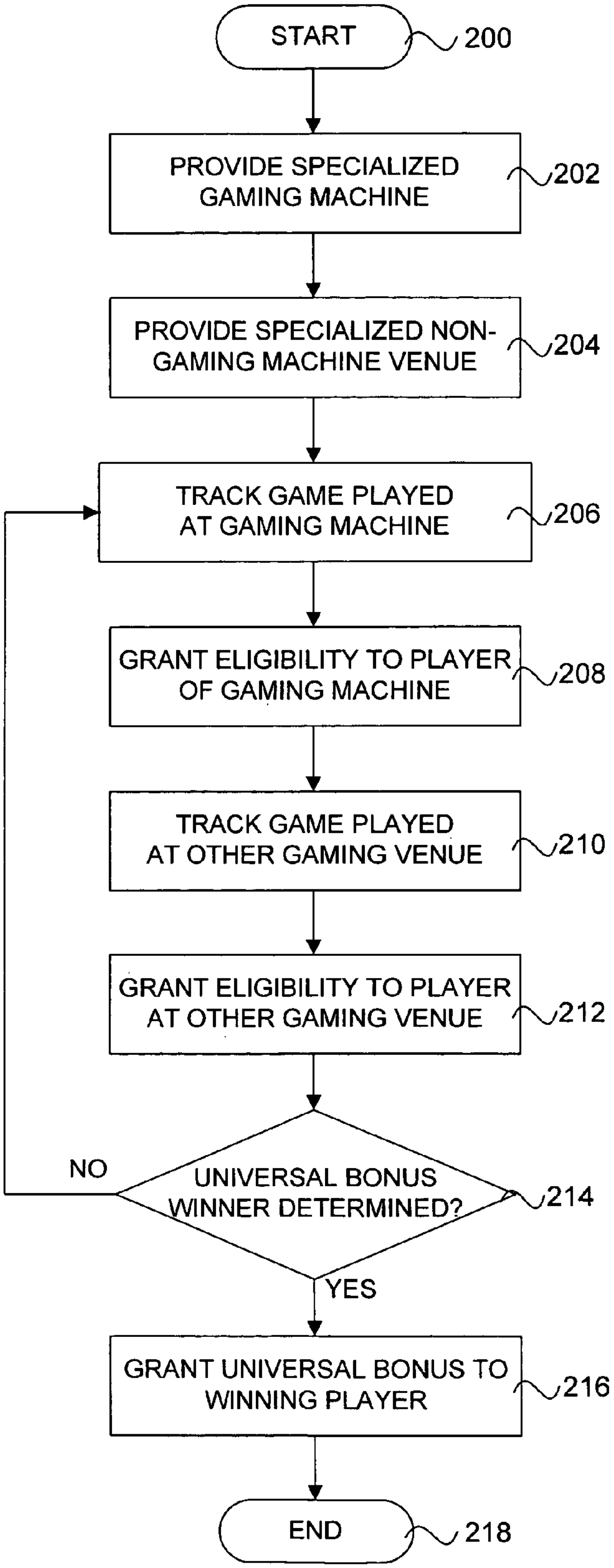
FIG. 4 illustrates a flowchart of one method of providing a universal bonus across disparate gaming offerings according to one embodiment of the present invention.

Turning now to FIG. 4, a flowchart conveying one exemplary method of providing a universal bonus across disparate gaming offerings according to one embodiment of the present invention is shown. While the provided flowchart may be comprehensive in some respects, it will be readily understood that not every step provided is necessary, that other steps can be included, and that the order of steps might be rearranged as desired by a given gaming manufacturer, operator, retrofitter or repairperson. After start step 200, a specialized gaming machine or other relevant gaming device is provided at a process step 202. While such a device can be a gaming machine with a housing and master gaming controller, as discussed above, it will also be understood that this gaming device could also be a similar gaming device adapted to host an automated gaming event based on a player wager, the play of a main or primary game based on the wager, and the possible grant of an award, including a monetary award, based on the outcome of the main game. Such a gaming machine or other similar automated gaming device is specialized in that it provides for the automated tracking of the gaming events played on it. For example, a player tracking device adapted to accept a player tracking card could be used in conjunction with such a gaming machine or other specialized gaming device.

At subsequent process step 204, a specialized non-gaming machine venue is provided. Such a non-gaming machine or gaming device venue could be, as noted above, a gaming table, a keno lounge, a sports book, a ticket drawing, or any other wager based gaming event hosted by a casino that is not gaming machine based. Again, particular gaming table examples include blackjack tables, poker tables, craps tables, roulette wheels, and the like. After both gaming machine related and non-gaming machine related specialized gaming venues are provided, then a universal bonus can be provided, such as a singular universal bonus award. As discussed above, such a bonus might be a "Lucky Sevens" bonus, whereby the first player to collect three sevens in a row at any gaming machine, table or other gaming venue participating in the universal bonus can win the bonus. For purposes of simplicity with respect to the present discussion, it will be assumed that only the specialized gaming machine of step 202 and the specialized non-gaming machine venue of step 204 are participating in this universal bonus. However, it will be understood that a wide variety of gaming machines, gaming tables and other non-gaming machine related venues can participate in such a bonus. Steps involving all such venues have been left out in order to greatly simplify the present discussion.

At a following process step 206, a main or primary game is tracked at the gaming machine. Based on any number of factors, which may or may not include the simple fact that a first player has placed a wager at the gaming machine, such a first player can then be granted eligibility to participate in the universal bonus at process step 208. Similarly, a main or primary game is tracked at the alternative gaming venue at process step 210, and eligibility to participate in the same universal bonus is then granted to a second player playing at the alternative gaming venue at process step 212. Again, such eligibility may or may not be due to the simple fact that the second player has placed a wager to play a game at the alternative gaming venue.

At subsequent decision step 214, an inquiry is made as to whether or not a winner has been determined from the universal bonus. Again, such a universal bonus can be a singular universal bonus, which may result in only one award to a lucky player or set of lucky players. Alternatively, such a universal bonus could be an ongoing bonus award that is made to any eligible winning combination or main game outcome for a set period of time. Under either alternative, such universal bonuses may also be part of a series of universal bonuses made as part of an overall universal bonusing scheme across multiple disparate gaming disciplines. If it is determined at decision step 214 that no universal bonus winner has been had, then the method reverts to process step 206, where game tracking and eligibility determinations or renewals can continue. Assuming that the universal bonus is a one time bonus and a winner has been determine, however, then the method moves instead to process step 216, where the universal bonus is granted to a winning player, after which the method then ends at end step 218. Of course, where ongoing universal bonuses are involved, or where a series of universal bonuses is to be awarded, then steps 206 through 216 may be repeated indefinitely as may be appropriate.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming system adapted for providing bonuses associated with gaming events involving the placement of a wager, the play of a main game based on the wager and the grant of a payout based on the result of the main game, the system comprising:

at least one gaming machine adapted for hosting gaming events involving a wager, the play of a gaming machine main game based on the wager and the grant of a payout based on the result of the gaming machine main game, said at least one gaming machine having an outer housing, a master gaming controller and at least one gaming machine tracking device adapted to facilitate the tracking of gaming events associated with a first patron playing at said at least one gaming machine;

at least one gaming table adapted for hosting gaming events involving a wager, the play of a gaming table main game based on the wager and the grant of a payout based on the result of the gaming table main game, said at least one gaming table having an upper surface adapted for the play of table games and at least one gaming table tracking device adapted to facilitate the tracking of gaming events associated with a second patron playing at said at least one gaming table; and a universal bonus server in direct or indirect communication with said gaming machine tracking device and said gaming table tracking device, said universal bonus server being adapted to track specific gaming activities at both of said at least one gaming machine and said at least one gaming table, wherein a singular universal bonus provided by said universal bonus server is simultaneously made available to said first player based on play at said at least one gaming machine and said second player based on play at said at least one gaming table, and wherein said singular universal bonus is funded at least in part by taking a portion of wagers at said at least one gaming machine and said at least one gaming table, and wherein the universal bonus server is configured to extend a bonus in a first game type based on a criteria of the first game type to a second game type not having the first criteria; wherein the universal bonus server is configured to provide the singular universal bonus to a first type of game having a first house to player edge, and a second type of game having a second house to player edge, the first house to player edge being smaller than the second house to player edge, and wherein in order to fund the singular universal bonus the universal bonus server is configured to take a portion of each wager from the first game and the second game, the portion taken from each wager of the first game being smaller than the portion taken from each wager of the second game.

2. The gaming system of claim 1, wherein said singular universal bonus is one of a plurality of universal bonuses provided by said universal gaming server.

3. The gaming system of claim 1, wherein said at least one gaming machine includes a plurality of gaming machines, wherein players at each of said plurality of gaming machines become eligible for said singular universal bonus based upon the play of gaming machine main games at said plurality of gaming machines, and wherein a plurality of disparate games are provided to players as possible gaming machine main games at said plurality of gaming machines.

4. The gaming system of claim 1, wherein said at least one gaming machine tracking device comprises a player tracking device.

5. The gaming system of claim 4, wherein said player tracking device comprises a card reader adapted to read a player tracking card.

6. The gaming system of claim 1, wherein said at least one gaming table tracking device comprises an RFID transponder located at said at least one gaming table and adapted to communicate with one or more gaming chips having RFID tags embedded therein located at said at least one gaming table.

7. The gaming system of claim 1, wherein said at least one gaming table tracking device comprises a camera system adapted to capture images of gaming chips involved in transactions at said at least one gaming table.

8. The gaming system of claim 1, wherein said singular universal bonus comprises a themed bonus that can be applied across a plurality of disparate types of games.

9. The gaming system of claim 8, wherein said themed bonus includes a "lucky number" that can be achieved during the play of main games at said plurality of disparate types of games.

10. The gaming system of claim 9, wherein said plurality of disparate game types include at least two games selected from the group consisting of: slot machine games, video poker games, keno games, sports book games, blackjack games, poker games, roulette games, and craps games.

11. The gaming system of claim 9, wherein said "lucky number" is determined by a specific outcome of a particular main game play selected from said plurality of disparate types of games.

12. The gaming system of claim 11, further including:

a database in communication with said universal bonus server, wherein said database is adapted to store information related to the tracking and administration of a plurality of singular universal bonuses provided by said gaming system.

13. The gaming system of claim 8, wherein said themed bonus includes a "lucky coin" that can be achieved during the play of main games at said plurality of disparate types of games, wherein said lucky coin comprises a specific coin number from the sum of all coins entered into all games eligible for the singular universal bonus.

14. A method of providing universal bonuses associated with gaming events involving a wager, the play of a game based on the wager and the grant of a payout based on the result of the game, the method comprising:

providing a gaming machine adapted for hosting gaming events involving a wager, the play of a gaming machine main game based on the wager and the grant of a payout based on the result of the gaming machine main game, said gaming machine having an outer housing, a master gaming controller and a first tracking device adapted to facilitate the tracking of gaming events associated with a first patron playing a first game at said gaming machine;

providing a non-gaming machine venue adapted for hosting gaming events involving a wager, the play of a non-gaming machine main game based on the wager and the grant of a payout based on the result of the non-gaming machine main game, said non-gaming machine venue having a second tracking device adapted to facilitate the tracking of gaming events associated with a second patron playing a second game at said non-gaming machine venue, the rules of said second game being substantially distinct in nature with respect to the rules of said first game;

tracking said first game played at said gaming machine, said first game involving the placement of a first wager by said first patron;

granting eligibility status to said first patron to be eligible for the award of a singular universal bonus based upon said first wager;

tracking said second game played at said non-gaming machine venue, said second game involving the placement of a second wager by said second patron;

granting eligibility status to said second patron to be eligible for the award of said singular universal bonus based upon said second wager;

funding said singular universal bonus by taking a portion of said first wager and a portion of said second, wherein said first game played at said gaming machine has a first house to player edge, and wherein said second game played at said non-gaming machine venue has a second house to player edge, the first house to player edge being smaller than the second house to player edge, and wherein funding the singular universal bonus comprises taking a smaller portion from the first wager than from the second wager; and awarding said singular universal bonus to said first patron or said second patron.

15. The method of claim 14, wherein said step of providing at least one non-gaming machine venue includes providing a gaming table having an upper surface adapted for the play of table games, and wherein said second tracking device includes at least one gaming table tracking device adapted to facilitate the tracking of gaming events associated with said second patron playing at said gaming table.

16. The method of claim 15, wherein said at least one gaming table tracking device comprises an RFID transponder located at said gaming table and adapted to communicate with one or more gaming chips having RFID tags embedded therein located at said at least one gaming table, and further including the steps of:

receiving an answer signal from at least one RFID gaming chip involved in said second game at said gaming table.

17. The method of claim 15, wherein said first game and said second game are played simultaneously.

18. A gaming system adapted for providing bonuses associated with gaming events involving the placement of a wager, the play of a main game based on the wager and the grant of a payout based on the result of the main game, the system comprising:

at least one gaming machine adapted for hosting gaming events involving a wager, the play of a gaming machine main game based on the wager and the grant of a payout based on the result of the gaming machine main game, said at least one gaming machine having an outer housing, a master gaming controller and at least one gaming machine tracking device adapted to facilitate the tracking of gaming events associated with a first patron playing at said at least one gaming machine;

at least one gaming table adapted for hosting gaming events involving a wager, the play of a gaming table main game based on the wager and the grant of a payout based on the result of the gaming table main game, said at least one gaming table having an upper surface adapted for the play of table games and at least one gaming table tracking device adapted to facilitate the tracking of gaming events associated with a second patron playing at said at least one gaming table; and a universal bonus server in direct or indirect communication with said gaming machine tracking device and said gaming table tracking device, said universal bonus server being adapted to track specific gaming activities at both of said at least one gaming machine and said at least one gaming table, wherein a singular universal bonus provided by said universal bonus server is simultaneously made available to said first player based on play at said at least one gaming machine and said second player based on play at said at least one gaming table, and wherein said singular universal bonus is funded at least in part by taking a portion of wagers at said at least one gaming machine and said at least one gaming table, and wherein the universal bonus server is configured to extend a bonus in a first game type based on a criteria of the first game type to a second game type not having the first criteria; wherein the universal bonus server is configured to provide the singular universal bonus to a first type of game contributing a first amount to a universal bonus pool fund, and a second type of game contributing a second amount to the universal bonus pool fund, the first amount being smaller than the second amount, and wherein universal bonus server is configured to maintain a higher requirement for the first type of game to hit the singular universal bonus than for the second type of game to hit the singular universal bonus.

* * * * *